(12) United States Patent
Schiller et al.

(10) Patent No.: US 12,017,490 B2
(45) Date of Patent: Jun. 25, 2024

(54) MOTOR VEHICLE BUMPER ASSEMBLY

(71) Applicant: BENTELER AUTOMOBILTECHNIK GMBH, Paderborn (DE)

(72) Inventors: Andreas Schiller, Geseke (DE); Elmar Mollemeier, Delbrueck (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 18/237,424

(22) Filed: Aug. 24, 2023

(65) Prior Publication Data

US 2024/0066934 A1 Feb. 29, 2024

(30) Foreign Application Priority Data

Aug. 25, 2022 (DE) .................... 10 2022 121 512.1

(51) Int. Cl.
*B60D 1/56* (2006.01)
*B60R 19/34* (2006.01)

(52) U.S. Cl.
CPC ............. *B60D 1/56* (2013.01); *B60R 19/34* (2013.01)

(58) Field of Classification Search
CPC .................................. B60D 1/56; B60D 1/565
See application file for complete search history.

(56) References Cited

U.S. PATENT DOCUMENTS

| 8,678,423 B1 * | 3/2014 | Hwang | B60R 19/34 280/505 |
| 2023/0158846 A1 * | 5/2023 | Kim | B62D 29/008 280/500 |

FOREIGN PATENT DOCUMENTS

| DE | 102004056249 A1 | 5/2006 | |
| DE | 102013015518 A1 | 7/2014 | |
| DE | 102019216208 A1 | 4/2021 | |
| DE | 102022001443 A1 | 7/2022 | |
| EP | 1464546 A2 * | 10/2004 | ............ B60D 1/488 |
| EP | 1638815 B1 | 5/2008 | |
| JP | 2010195082 A | 9/2010 | |
| JP | 2011016404 A | 1/2011 | |
| KR | 101073952 B1 | 10/2011 | |
| KR | 20160001820 A | 1/2016 | |

OTHER PUBLICATIONS

Decision to Grant for German Application No. 10 2022 121 512.1 dated Jun. 22, 2023; 10pp.
Office Action for German Application No. 10 2022 121 512.1 dated Apr. 19, 2023, 2023; 14pp.

\* cited by examiner

*Primary Examiner* — Kevin Hurley
(74) *Attorney, Agent, or Firm* — HAUPTMAN HAM, LLP (57) ABSTRACT

A bumper assembly for a motor vehicle has a cross member and crash boxes. The cross member has a front side open profile with a rear wall and an upper leg and a lower leg. Furthermore, a tow bushing is provided. The tow bushing is able to be arranged above the upper leg or below the lower leg and is able to be arranged laterally offset next to a crash box.

10 Claims, 6 Drawing Sheets

MOTOR VEHICLE BUMPER ASSEMBLY

RELATED APPLICATIONS

The present application claims priority to German Application Number 10 2022 121 512.1 filed Aug. 25, 2022, the disclosure of which is hereby incorporated by reference herein in its entirety.

FIELD

The disclosure relates to a bumper assembly for a motor vehicle.

BACKGROUND

Bumper assemblies are installed as standard on the front and rear of motor vehicles in order to absorb impact energy from impact processes, so that the supporting structure of the motor vehicle is not damaged as far as possible. In addition, bumper assemblies should help to minimize injuries to pedestrians or cyclists. Bumper assemblies have a cross member which are able to be fixed transversely to the longitudinal members of a motor vehicle with the incorporation of crash boxes. The purpose of the cross member is to direct the energy resulting from an impact into the crash boxes, where the impact energy is to be converted into deformation work.

EP 1 638 815 B1 makes a bumper assembly which has a bumper bar or cross member in the form of an open C-profile, which is suitable for being bracketed with its opening to the outside of the vehicle.

A vehicle with a configured bumper assembly is described in DE 10 2022 001 443 A1. The bumper assembly includes a cross member and crash boxes, wherein the cross member has a profile with a rear wall and an upper leg and a lower leg. Furthermore, a tow bushing is provided, which is arranged below the lower leg of the cross member, wherein the tow bushing is attached to a bracket which is joined to the cross member.

KR 10 2016 001 820 A describes a bumper assembly with a closed cross member having two hollow chambers arranged one above the other. A tow bushing is integrated into the upper hollow chamber of the cross member and penetrates the hollow chamber.

Bumper assemblies for motor vehicles are described in JP 2011-16404 A, KR 1073952 B1 or JP 2010-195082 A.

In accordance with legal requirements, motor vehicles must have a sufficiently dimensioned and easily accessible device for attaching a towing bar or a towing rope at the front and rear. Towing devices have a towing socket that is accessible from the outside and into which a towing eyelet is able to be screwed for towing a motor vehicle. A towing device with a tow bushing is described, for example, in DE 10 2004 056 249 A1. DE 10 2013 015 518 A1 and DE 2019 216 208 A1 also include a towing device with a tow bushing arranged in a bracket. The towing device is integrated in a crash box, which leads to vehicle-specific restrictions with regard to the arrangement of the towing device.

SUMMARY

The present disclosure is directed to the object of creating a functionally improved motor vehicle bumper assembly with greater flexibility with regard to the positioning of the towing device.

The motor vehicle bumper assembly includes a cross member and crash boxes. The cross member extends in the y-axis (vehicle transverse axis) of the motor vehicle. The cross member has a profile which is open towards the front of the motor vehicle and has a rear wall and an upper leg as well as a lower leg. The profile of the cross member is U-shaped or hat-shaped or C-shaped in cross-section and is open to the front. The rear wall of the cross member faces the motor vehicle. A channel open at the front extends over the length of the cross member.

The bumper assembly includes a towing device with a tow bushing that is fixed to the cross member. The tow bushing is provided with an internal thread into which a towing eyelet with an externally threaded section is able to be screwed.

The tow bushing is arranged above the upper leg and/or below the lower leg outside of a crash box. Here, the tow bushing is attached to a bracket. The bracket is joined to the cross member.

At least one embodiment of the bumper assembly according to the disclosure provides that the tow bushing is arranged above the upper leg or below the lower leg and laterally offset next to a crash box. Laterally offset means that the tow bushing is arranged laterally in the vehicle transverse axis (y-axis) at a distance from the vertical central longitudinal plane extending through a crash box. The tow bushing is arranged laterally at a distance from a side wall of the next adjacent crash box. The distance between the tow bushing or its bracket and the crash box are able to be dimensioned in such a way that the crash box and bracket and the cross member are able to be joined with sufficient accessibility, for example, for welding processes.

Terms such as transversely and longitudinally, above and below, horizontally and vertically or longitudinally and transversely as well as top and bottom each relate to the installation position of the bumper assembly in a motor vehicle.

A vehicle coordinate system characterizes the axes within a motor vehicle. The x-axis corresponds to the longitudinal axis of the vehicle, the y-axis corresponds to the transverse axis of the vehicle and the z-axis corresponds to the vertical axis of the vehicle.

According to the disclosure, the tow bushing is attached to a bracket. The bracket is joined to the cross member and optionally also to an adjacent crash box. An adjacent crash box is the crash box closest to the bracket. The bracket with the tow bushing is located outside of a crash box and also outside of the channel of the cross member.

According to the disclosure, the bracket has a front flange and a rear flange. The front flange and the rear flange are arranged at a distance from one another in the longitudinal axis of the tow bushing. The longitudinal axis of the tow bushing extends in the longitudinal axis of the vehicle (x-axis). The tow bushing is joined with the front flange and the rear flange. Fixing the tow bushing on the front flange and rear flange arranged at a distance from one another in the longitudinal axis of the vehicle (x-axis) ensures a stable arrangement.

The bracket has a first L-profile and a second L-profile that are placed together. The L-profiles are angle irons made of steel, the flanges of which are able to be equal or unequal. The two L-profiles are put together to hold the bracket. The two L-profiles are put together in such a way that they form a hollow profile. This cross-sectionally rectangular configuration of the bracket ensures a high area moment of inertia, so that the bracket is subjected to and able to withstand bending and torsional stress. The bracket is compact and stable. The front flange is formed on one L-profile and the rear flange is formed on the other L-profile. In this way, a cost- and weight-saving, but highly stable construction of the bracket is given.

The bracket for the tow bushing includes the first L-profile and the second L-profile. A receptacle is provided in both the front flange and the rear flange, in which the tow bushing is positioned and held. The tow bushing is connected to the bracket in a materially bonded manner which takes place in or along the receptacles. The receptacles are able to be implemented as circular openings in the flanges, wherein the diameter of the receptacles is adapted to the outer diameter of the tow bushing.

Due to space requirements, the distance between the tow bushing and an adjacent crash box is so small that the bracket is unable to be joined to the cross member in the assembled state. In this case, the bracket composed of individual components, for example, the L-profile design of the bracket, allows the bracket to be joined step by step with optimized accessibility for a joining process, for example, welding, without negatively influencing or blocking the weldability of the crash box to the cross member. The crash box is also able to first be joined to the cross member, and the front or front first L profile of the bracket is able to be joined to the cross member, and then the second rear L profile is able to be joined to the first L profile.

At least one embodiment provides that the bracket has a connection area on the lower end on the cross member side. Depending on the position of the bracket, the bracket rests above or below the cross member with the connection area on the upper leg or on the lower leg and on the rear wall and is at least partially joined to the cross member in the contact area. The connection area is configured to match the joint surfaces of the cross member.

In at least one embodiment, the bracket is joined to the cross member. Here, the bracket is on the upper leg of the cross member. The upper outer web, which is directed towards the motor vehicle, butts against the bracket with its front side in the area of the bracket. In the joint area or contact area between the upper outer web and the bracket on the front flange of the bracket, these are joined with a material bond.

In the case of high vehicles, the bracket with the tow bushing is able to be arranged below the cross member. Here, the bracket abuts against the lower leg of the cross member. The upper outer web, which is directed towards the motor vehicle, butts against the bracket with its front side in the area of the bracket. In the joint area, the lower outer web and the bracket are materially bonded to one another.

At least one embodiment of the disclosure provides that the cross member has a striking plate at the front in the area in front of at least one crash box or in the area of the bracket. The striking plate is provided in front of the crash box, which is arranged adjacent to, i.e., closest to, the towing device with the bracket and the tow bushing. The striking plate in the area in front of the crash box and/or in the area of the bracket ensures vehicle-specific load behavior. Bending loads resulting from a towing operation, during which tensile forces and bending moments are introduced into the cross member via the towing device, are able to be compensated for by the striking plate. The striking plate functions as a tension strut and prevents the cross member from bending and/or twisting as a result of loading during a towing operation.

In addition to the striking plate in the area in front of a crash box and/or in front of a bracket, a striking plate or a reinforcement insert or a patch is also arranged in a central section of the cross member or the profile of the cross member and is connected to the profile of the cross member by a material bond.

A configuration that improves the load behavior of the cross member overall provides that at the front end of a leg of the cross member or of the profile of the cross member there is a front web directed transversely to this, which is followed by an outer web angled towards the motor vehicle. A front web extending in the transverse direction of the vehicle (y-axis) is provided both on the upper leg and on the lower leg. The front web on the upper leg is directed upwards. The front web on the upper leg is directed upwards. Angled in the direction of the motor vehicle, an upper outer web adjoins the upper front web and a lower outer web adjoins the lower front web. At least in sections, the outer web is able to be adjoined by an end web angled therefrom. An end web is provided on the bottom outer web on the bottom side. The end web is folded down from the lower outer web.

At least one embodiment of the bumper assembly according to the disclosure includes that the bracket is fastened in a supporting manner on the front web and/or on the outer web and/or on the end web. Depending on the execution, the bracket is arranged on top of the cross member or on the underside of the cross member. In this case, the bracket is supported on the component sections of the cross member and is joined thereto, and is able to be welded in a materially bonded manner along the joining surfaces which are in contact with one another.

BRIEF DESCRIPTION OF THE DRAWINGS

Other advantages, features, properties, aspects of the present disclosure are set out in the following description. They provide a simpler understanding of the disclosure. Exemplary embodiments of the disclosure are illustrated in the set of drawings and will be described in greater detail below. In the drawings.

DETAILED DESCRIPTION

In the Figures, the same reference numerals are used for identical and similar components, even if a repeated listing is omitted for reasons of simplicity.

Figure 1:
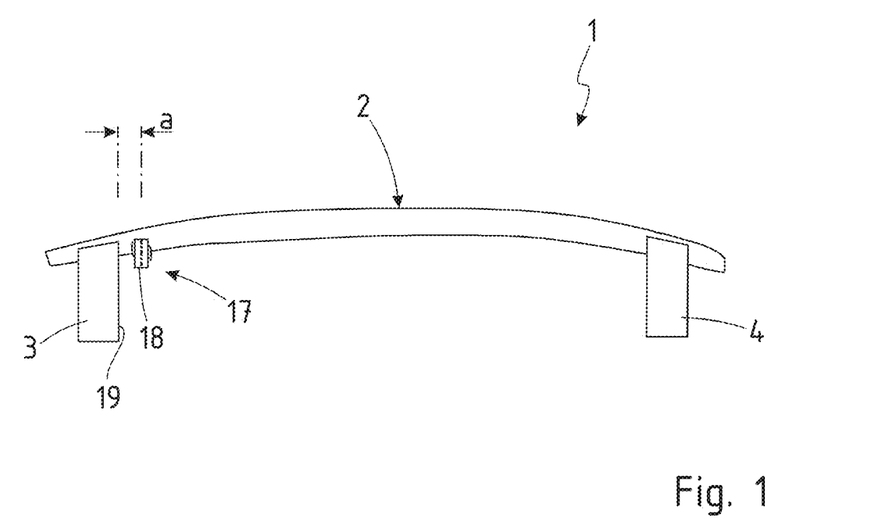
FIG. 1 shows a technically simplified and schematic top view of a motor vehicle bumper assembly according to at least one embodiment of the disclosure.
Figure 2:
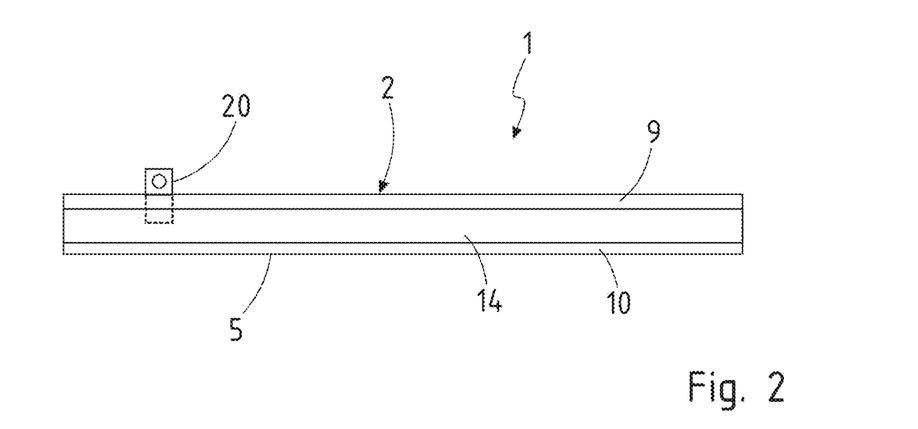
FIG. 2 shows the bumper assembly according to the illustration in FIG. 1 in a front view.
Figure 10:
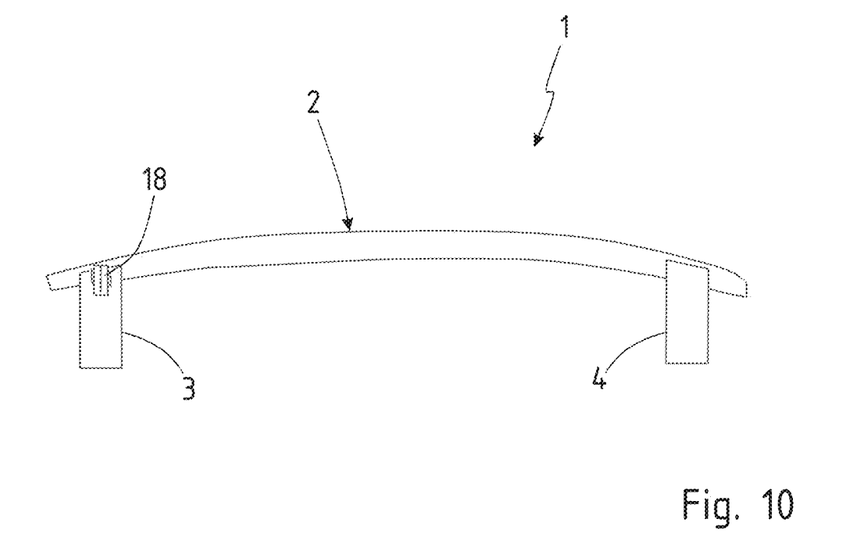
FIG. 10 shows, again in a technically simplified and schematized manner, a top view of an alternative embodiment of a motor vehicle bumper assembly.
Figure 11:
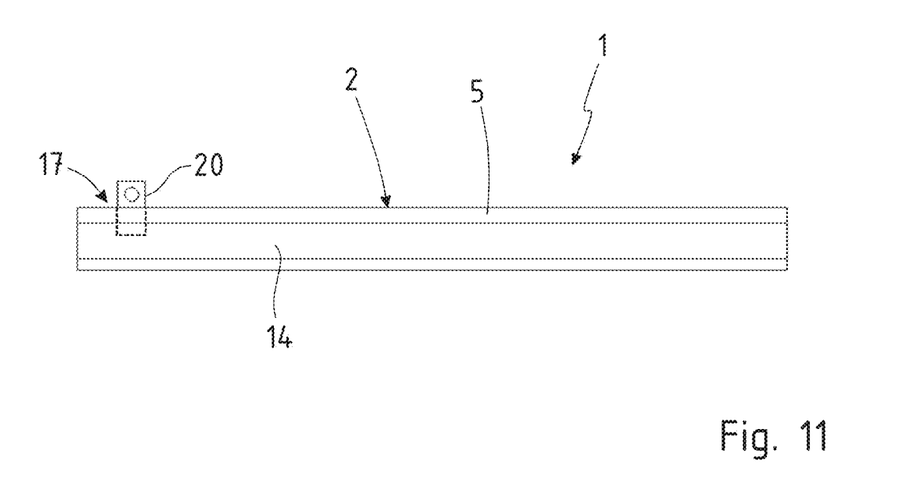
FIG. 11 shows the schematic representation according to FIG. 10 in a front view.

A bumper assembly 1 for a motor vehicle is shown in each of FIGS. 1 and 2 and in FIGS. 10 and 11. The bumper assembly 1 is used in the front or rear area, in the front area of the body of a motor vehicle.

The bumper assembly 1 has a cross member 2 arranged transversely to the longitudinal members of a motor vehicle, not shown here. The bumper assembly 1 is supported on the longitudinal members via crash boxes 3, 4, which are provided at the end or in the end area of the cross member 2. In addition to the cross member 2, the crash boxes 3, 4 are intended to absorb the energy resulting from an impact by converting the energy into deformation work.

The cross member 2 extends in the vehicle transverse axis (y-axis) and is formed in one piece from a metal sheet, for example, a steel sheet. The cross member 2 has a U-shaped or hat-shaped or C-shaped profile 5 in vertical cross section (see also the representation in FIGS. 3 and 4 as well as FIGS. 8 and 9). The cross member 2 has a rear wall 6 and an upper leg 7 and a lower leg 8. Both the upper leg 7 and the lower leg 8 are joined at the front by a front web 9, 10 directed outwards transversely to the respective leg 7, 8. The upper front web 9 is adjoined by an upper outer web 11 directed toward the motor vehicle. The lower front web 10 is adjoined by a lower outer web 12 angled toward the motor vehicle. In turn, an end web 13 directed downwards from this connects to the lower outer web 12. Even if an outer web 12 is provided in an embodiment such as the embodiment shown here, this is able to be omitted completely or in sections given certain installation space restrictions.

A channel 14 which is open at the front extends over the length of the cross member 2 in the longitudinal direction. The channel 14 is formed by the U- or hat- or C-shaped profile 5 of the cross member 2. The cross-sectional configuration of the profile 5 extends at least over the majority of the length of the cross member 2, for example, to beyond the crash boxes 3, 4 in the lateral end sections 15 of the cross member 2. The profile 5 of the cross member 2 is open towards the front side 16. The open front side 16 is directed away from the motor vehicle to the front or rear.

The bumper assembly 1 has a towing device 17 with a tow bushing 18. The tow bushing 18 is arranged outside a crash box 3, 4 and is located above the upper leg 7 of the cross member 2 in the illustrated embodiments.

The tow bushing 18 is also able to be arranged below the lower leg 8 (not shown in the figures).

In the bumper assembly 1 shown in FIGS. 1 and 2, the tow bushing 18 is arranged above the upper leg 7 and offset laterally outside of a crash box 3 next to the crash box 3. In the vehicle transverse axis (y-axis), the tow bushing 18 is at a distance a from the inner side wall 19 of the closest, i.e., the adjacent crash box 3.

The tow bushing 18 is attached to a bracket 20, wherein the bracket 20 is joined to the cross member 2 and optionally to an adjacent crash box 3.

The basic structure of the bracket 20 is the same in the embodiments of the bumper assembly 1, as shown in FIGS. 1 and 2 and in FIGS. 10 and 11.

The bracket 20 has a first L-profile 21 and a second L-profile 22, which are placed together and joined together. The L-profiles 21, 22 assembled to form the bracket 20 enclose a cavity with a substantially rectangular cross-section.

The bracket 20 has a front flange 23 and a rear flange 24, each of which is formed by a leg of the first L-profile 21 and the second L-profile 22, respectively. The legs of the L-profiles 21 and 22 forming the front flange 23 and the rear flange 24 are longer than the lateral legs 25, 26 of the L-profiles 21, 22 directed transversely thereto in the y-axis. The front flange 23 and the rear flange 24 are arranged in the longitudinal axis L of the tow bushing 18 at a distance b from one another. Along the abutting contact surfaces between the L-profiles 21, 22 or the flanges 23, 24 and the lateral legs 25, 26, these are joined together in a materially bonded manner. The tow bushing 18 is joined with the front flange 23 and the rear flange 24.

The front flange 23 has a receptacle 27 and the rear flange 24 has a receptacle 28 in which the tow bushing 18 is held and joined to the bracket 20. The tow bushing 18 is cylindrical with a circular outer circumference. Correspondingly, the receptacles 27, 28 in the front flange 23 and in the rear flange 24 are formed by circular openings. The tow bushing 18 is held in the receptacles 27, 28 and joined to the flanges 23, 24 in a cohesive manner.

Figure 6:
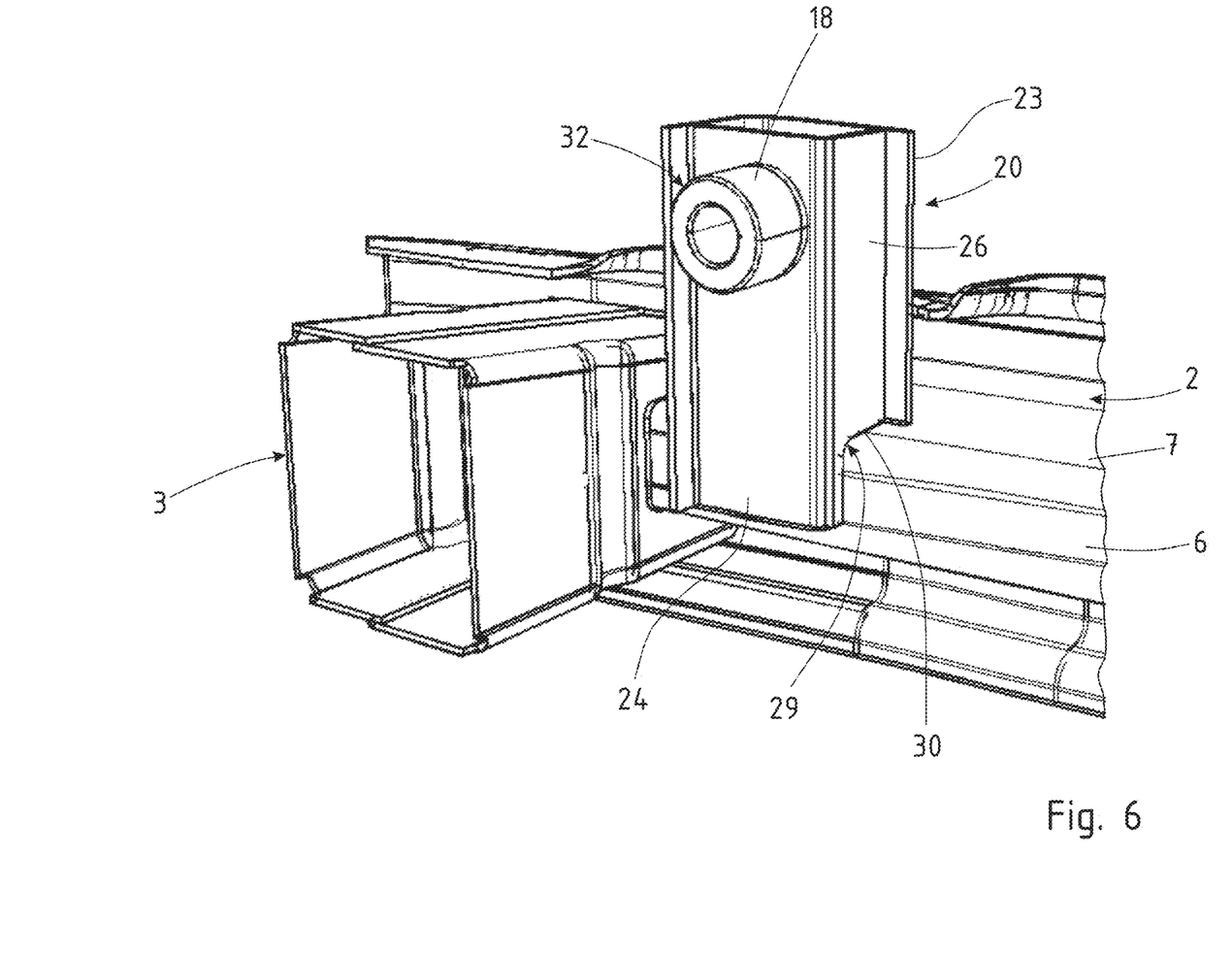
FIG. 6 shows a perspective representation of the detail according to the representation of FIG. in a rear view.
Figure 7:
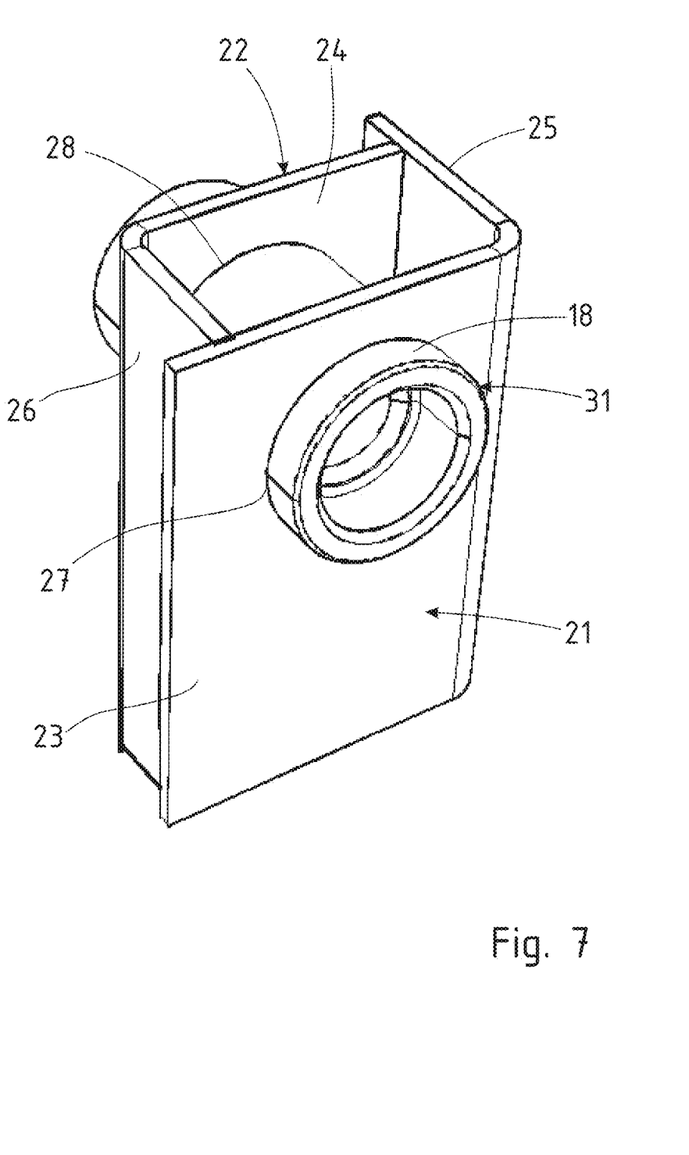
FIG. 7 shows a towing device with a bracket and a tow bushing according to at least one embodiment of the disclosure.

As able to be seen in FIG. 6, the bracket 20 has a connection area 30 on the lower end 29 on the cross member side. The bracket 20 is placed on the cross member 2. In this case, the bracket 20 rests with the connection area 30 on the upper leg 7 and at least in certain areas on the rear wall 6 of the cross member 2 and is joined to the cross member 2.

Figure 8:
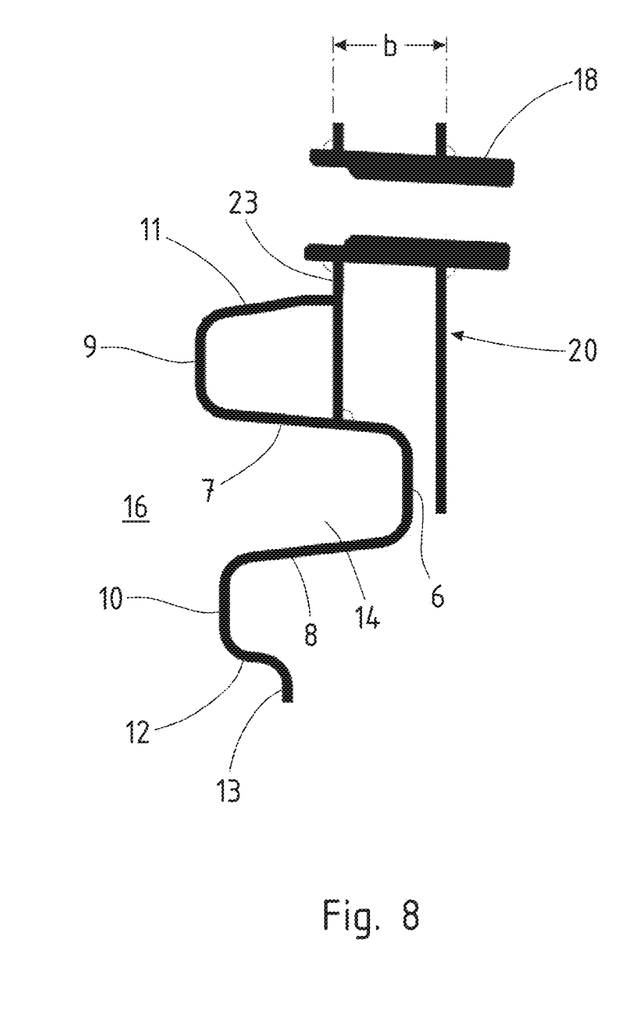
FIG. 8 shows a vertical cross section through a bumper assembly in an area outside of a crash box according to at least one embodiment of the disclosure.
Figure 9:
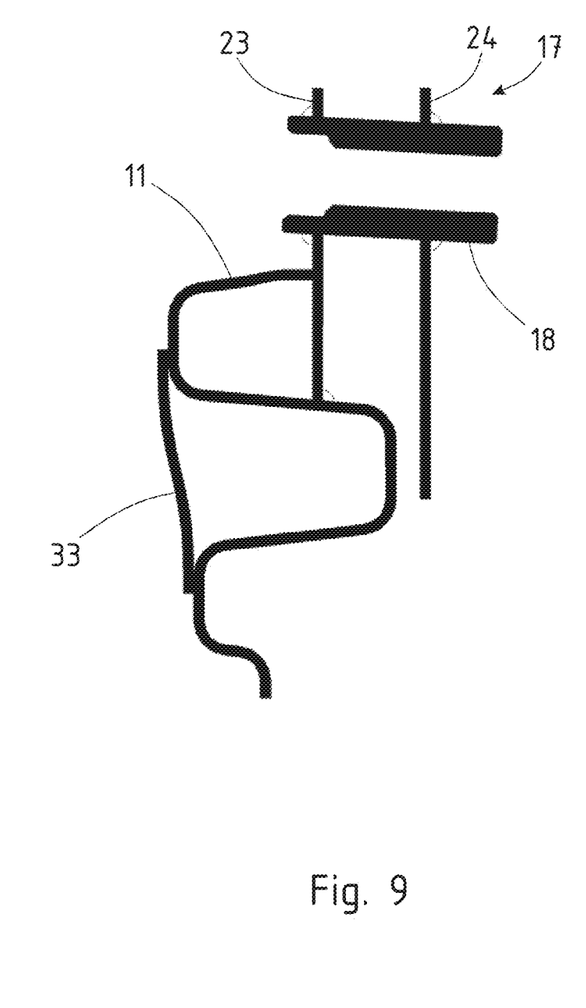
FIG. 9 shows a vertical cross section through a bumper assembly in the area adjacent to a crash box with a front striking plate according to at least one embodiment of the disclosure.

From FIGS. 8 and 9 the bracket 20 is joined to the upper leg 7 on the upper side. Furthermore, the upper outer web 11 of the cross member 2 abuts the front flange 23 and is joined thereto.

An embodiment in which the bracket is joined to both the cross member 2 and the adjacent crash box 3 is not shown.

The tow bushing 18 is accommodated in the bracket 20 and joined to the bracket 20. Here, the tow bushing 18 protrudes with a front end 31 opposite the front flange 23 and with a rear end 32 opposite the rear flange 24 of the bracket 20. Here, the protrusion at the rear end 32 is greater than the protrusion at the front end 31.

Figure 3:
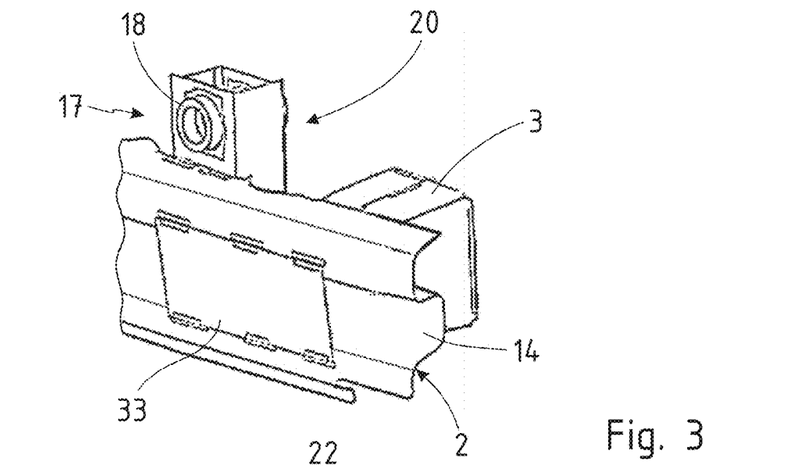
FIG. 3 shows a section of a bumper assembly according to at least one embodiment of the disclosure.

In the embodiment shown in FIG. 3, a striking plate 33 is provided on the front in the area in front of the crash box 3 adjacent to the towing device 17. The striking plate 33 stiffens the bumper assembly 1 in the end region on the crash box side and compensates for tensile forces and/or bending moments which are introduced into the bumper assembly 1 via the towing device 17. The striking plate 33 extends in the longitudinal direction of the profile 5 of the cross member 2 into the area in front of the bracket 20.

Figure 4:
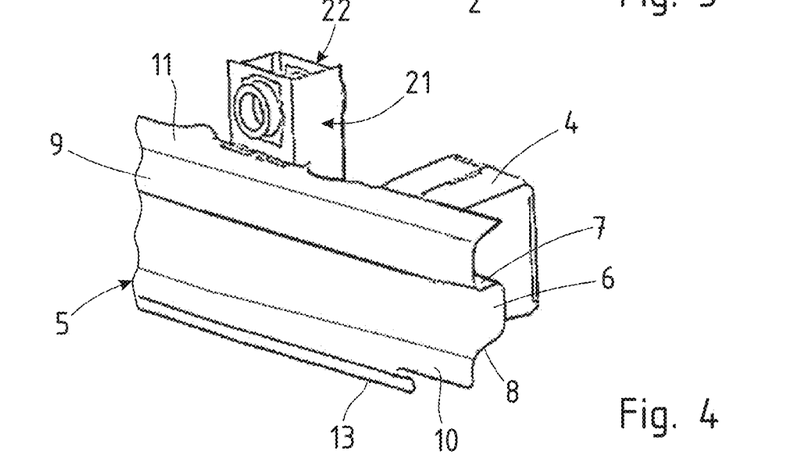
FIG. 4 shows a detail from an alternative embodiment of the bumper assembly according to at least one embodiment of the disclosure.
Figure 5:
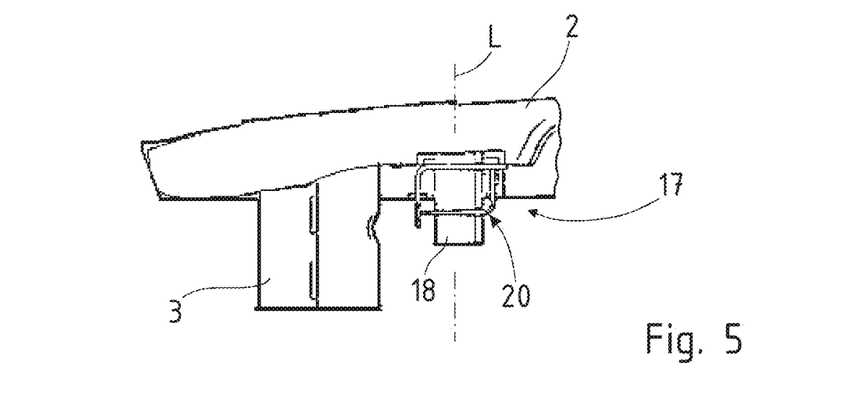
FIG. 5 shows a plan view of an end region of a motor vehicle bumper assembly on the crash box side according to at least one embodiment of the disclosure.

In the embodiment shown in FIG. 4, no striking plate is arranged in front of the crash box 4. This is able to be an embodiment of the bumper assembly 1 without a striking plate. However, FIG. 3 also corresponds to the representation of the end region on the crash box side at the other end of the bumper assembly 1 or the cross member 2 (on the right in the image plane of FIGS. 1 and 10) with the crash box 4.

In the bumper assembly 1 according to the illustration in FIGS. 1 and 2, the bracket 20 is arranged vertically offset above the upper leg 7 of the cross member 2 and laterally offset next to the crash box 3, as explained with reference to FIGS. 3 to 9. The bracket 20 with the tow bushing 18 is located outside of the crash box 3 and outside of the cross member 2.

In the embodiment of the bumper assembly 1 as shown in FIGS. 10 and 11, the bracket 20 with the tow bushing 18 is arranged above the upper leg 8 of the cross member 2 and above the crash box 3. The representation is technically simplified and schematic. The design is such that the crash box 3 with its cross member-side end encompasses the profile 5 of the cross member 2 in some areas. The bracket 20 is arranged above the upper leg 7 of the profile 5 and joined to the cross member 2 and the crash box 3.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A bumper assembly for a motor vehicle, comprising:
a cross member; and
crash boxes,
the cross member comprising:
   a profile which is open towards a front side of the cross member;
   a rear wall;
   an upper leg and a lower leg; and
   a tow bushing, wherein
      the tow bushing is arranged above the upper leg or below the lower leg, the tow bushing is attached to a bracket which is joined to the cross member, and
      the bracket comprises a front flange and a rear flange, the front flange and the rear flange arranged at a distance from one another in a longitudinal axis of the tow bushing which is joined to the front flange and the rear flange.

2. The bumper assembly according to claim 1, wherein the tow bushing is arranged laterally offset next to one of the crash boxes.

3. The bumper assembly according to claim 1, wherein the bracket is joined to an adjacent crash box of the crash boxes.

4. The bumper assembly according to claim 1, wherein the bracket comprises a first L-profile and a second L-profile, which are placed together to form a hollow profile.

5. The bumper assembly according to claim 1, wherein the front flange has a first receptacle, the rear flange has a second receptacle, and the tow bushing is held in the first and second receptacles.

6. The bumper assembly according to claim 1, wherein
   the bracket has a connection area on a lower end of the bracket, the lower end being on a side of the cross member, and
   in the connection area, the bracket rests on and is joined with
      the upper leg or the lower leg, and
      the rear wall of the cross member.

7. The bumper assembly according to claim 1, wherein the cross member has a striking plate in at least one of
   an area in front of one of the crash boxes, or
   an area of the bracket.

8. The bumper assembly according to claim 1, further comprising:
   a front web on a front side of a leg of the upper leg and the lower leg, which front web is directed transversely to the leg.

9. The bumper assembly according to claim 8, further comprising:
   an outer web which is adjoined to the front web, and is angled towards the motor vehicle; and
   an end web which is angled away from the outer web and is connected to the outer web at least in sections.

10. The bumper assembly according to claim 9, wherein the bracket is supported on, and is at least partially joined with, at least one of the front web, the outer web or the end web.

* * * * *